United States Patent
Hebert et al.

(10) Patent No.: US 6,868,542 B1
(45) Date of Patent: Mar. 15, 2005

(54) METHOD AND APPARATUS FOR PROVIDING RELIABLE INTEROPERATION OF A PLURALITY OF INDEPENDENT SOFTWARE MODULES

(75) Inventors: Martin Hebert, Kanata (CA); Nelson Gillette, Stittsville (CA); Richard Charles Vieregge, Nepean (CA); Scott Joseph Brookes, Ottawa (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/295,818

(22) Filed: Apr. 21, 1999

(51) Int. Cl.[7] .................................................. G06F 9/54
(52) U.S. Cl. ................................... 719/316; 709/223
(58) Field of Search ......................... 719/310–320; 717/168–178; 709/223–226, 229; 713/201; 345/733

(56) References Cited

U.S. PATENT DOCUMENTS 5,675,782 A * 10/1997 Montague et al. .......... 713/201
5,999,978 A * 12/1999 Angal et al. ................ 709/229
6,225,994 B1 * 5/2001 Davis et al. ................ 345/733

* cited by examiner

Primary Examiner—St. John Courtenay, III (57) ABSTRACT

A method and apparatus that includes processing for providing reliable interoperation of the plurality of independent software modules. Such processing begins by determining selection of an object by one of a plurality of independent software modules to produce a new object selection. The processing then continues by determining object selection status, which indicates a selected object and an associated one of the plurality of independent software modules. In other words, the object selection status indicates which independent software module is currently managing a particular object. The processing then continues by updating the object selection status when a difference occurs between at least one of the independent software modules identified currently in the object selection status and the independent software module selecting the object, and/or the newly selected object is different from the object identified in the object selection status. In other words, the object selection status is updated to correspond the selecting software module to be responsible for management of the selected object. If such was already indicated in the object selection status no change occurs.

37 Claims, 6 Drawing Sheets

METHOD AND APPARATUS FOR PROVIDING RELIABLE INTEROPERATION OF A PLURALITY OF INDEPENDENT SOFTWARE MODULES

TECHNICAL FIELD OF THE INVENTION

This invention relates generally to interoperation of software modules and more particularly to interoperation of software modules associated with a communication network.

BACKGROUND OF THE INVENTION

Communication networks are known to include a plurality of switches that are interoperably coupled to support communications between users coupled to ports of the communication network. The users may be end users such as personal computers, telephones, facsimile machines, videophones, etc., or may be servers, routers, private branch exchanges (PBX), etc. Such users communicate in various forms, such as voice, data, or a combination thereof, via communication paths supported by the communication network. The communication paths may be established using dedicated links or allocating links upon receipt of communication requests.

Many communication networks include a network management system, such as the 46020 MainStreetXPress Network Manager manufactured and distributed by Newbridge Networks Corporation. The network management system (NMS) manages the communication network by establishing the dedicated communication links, performing diagnostics on switches, links, etc., within the network, configuring the switches and/or links, reporting of network equipment faults and network performance criteria Multiple system managers may be coupled to the network management system, wherein each of the network service managers is responsible for a portion of the communication network. Such managers interact with the network management system via graphical user interfaces (GUI). The GUI presents the user, i.e., the manager, with representations of the network. At the highest level, the entire network is visible, and navigation techniques allow the manager to zoom in and out of various components that make up the network. The NMS allows each of the managers to perform other operations as well. To perform another operation, the manager chooses an object, which corresponds to a particular component of the network, via the GUI. Having selected the object, the GUI highlights the selected object and displays a menu of operations that may be executed upon the selected object. Note that only a single object per connection can be selected at any one time by any one manager. As such, the NMS supports several computer processes, one for each manager, that are executing simultaneously to manage the communication network.

As communication networks become more sophisticated, or the communication network changes by adding new products and/or more functionality, the software of the NMS may need to be updated for each change of the communication network. As one would expect, updating the NMS software, at times, produces bottlenecks in release of new communication network components and/or supporting software. To overcome this issue, the network was divided into areas of control, wherein each area is managed by an element manager (EM). As such, the task of managing the network is performed by the NMS and possibly one or more element managers. Generally, element-specific actions are handled by the element manager, such as an element configuration, and network actions are handled by the NMS, such as provisioning of bandwidth across multiple network components. Such actions are performed by selecting the network or element object in the appropriate user interface window, and then performing the action. Since there is some overlap between the responsibilities of an element manager and the NMS software, some objects are visible on both the NMS and EM user interfaces.

To maintain and/or improve user friendliness of the NMS and EM software, the user interface appeared as a single interface. As such, the user is able to perform the desired actions and the software determines whether the NMS software or the EM software performs the particular function. In addition, the NMS software and EM software only allows one object to be selected at any given time, regardless of whether the object is managed by the NMS software or the EM software. An issue arises when an object is managed by both the NMS software and the EM software. Since both NMS and EM software have managerial responsibilities for a particular selected object, it may be selected through the NMS software or the EM software. If the object is selected by the NMS software and the NMS software subsequently performs the desired action upon the object, the issue is avoided. The issue, however, arises when the NMS software has selected the object, or the EM software has selected the object, and subsequently selected by the other software (e.g., the NMS software or the EM software). When this happens, the next selected function may not be executed by the correct software on the expected object since there is a variety of objects selected and a variety of software modules involved. As such, the desired operation is not performed properly.

Therefore, a need exists for a method and apparatus to manage software objects, such as objects relating to components of a communication network, by multiple software managers.

DETAILED DESCRIPTION OF A PREFERRED EMBODIMENT

Generally, the present invention provides a method and apparatus that includes processing for providing reliable interoperation of the plurality of independent software modules. Such processing begins by determining selection of an object by one of a plurality of independent software modules to produce a new object selection. The processing then continues by determining object selection status, which indicates a selected object and an associated one of the plurality of independent software modules. In other words, the object selection status indicates which independent software module is currently managing a particular object. The processing then continues by updating the object selection status when a difference occurs between at least one of the independent software modules identified currently in the object selection status and the independent software module selecting the object, and/or the newly selected object is different from the object identified in the object selection status. In other words, the object selection status is updated to correspond the selecting software module to be responsible for management of the selected object. If such was already indicated in the object selection status no change occurs. With such a method and apparatus, maintaining knowledge of which software module is responsible for managing which object, multiple independent software modules that have overlapping responsibilities for objects can function independently without loss of requested operations, regardless of which software module received the particular operation request.

Figure 1:
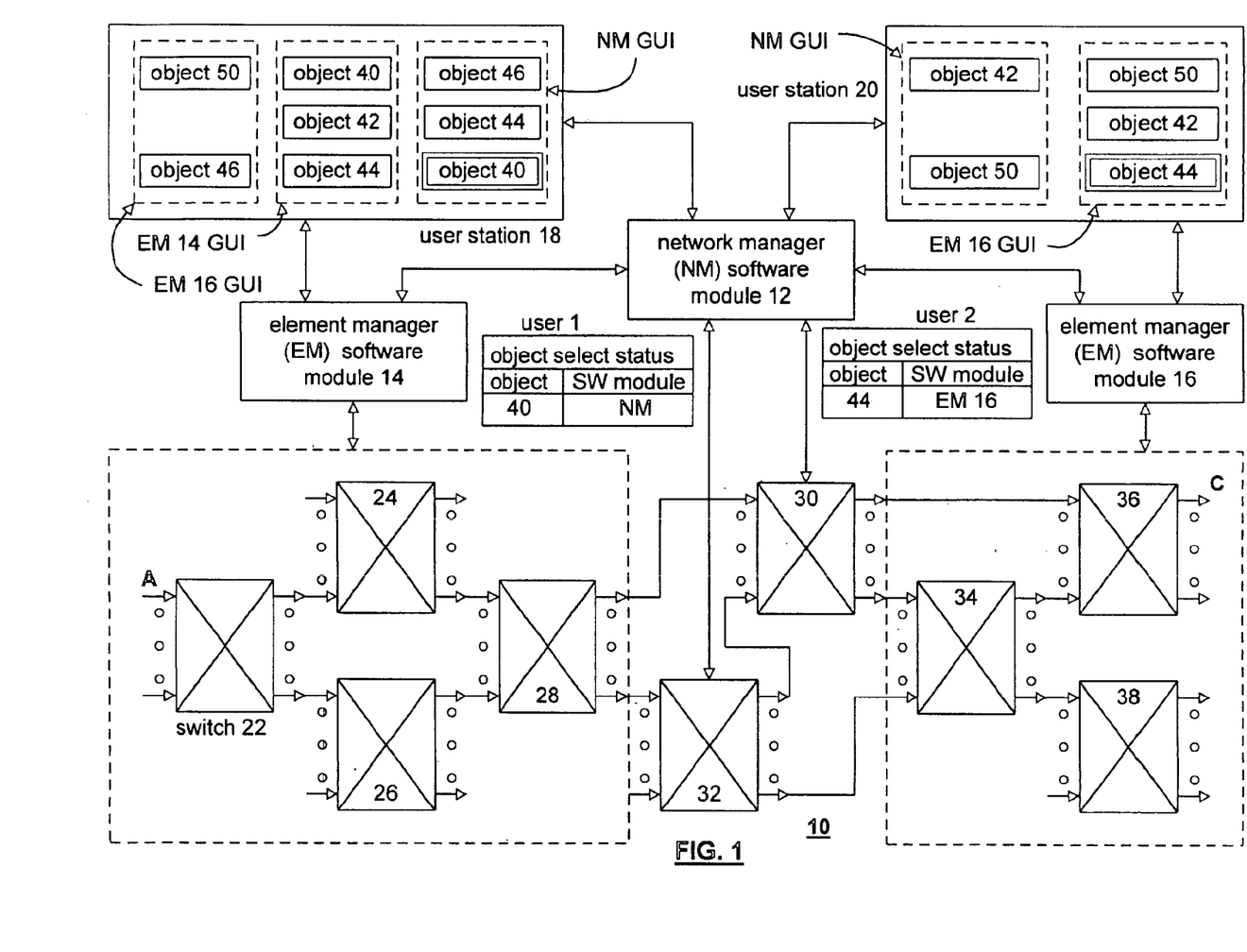
FIG. 1 illustrates a schematic block diagram of a communication network in accordance with the present invention.

The present invention can be more fully described with reference to FIGS. 1–7. FIG. 1 illustrates a schematic block diagram of a communication system, or network, that includes network management software module 12, a plurality of element manager (EM) software modules 14 and 16, a plurality of user stations 18 and 20, and a plurality of communication switches 22–38. The network manager software module 12 and the plurality of element manager software modules 14 and 16 may be operated by a single computer system, or a plurality of computer systems. Such software modules 12–16, are similar to the software modules currently available in the Newbridge Network Corporation's network management system such as the 46020 MainStreetXPress Network Manager and as further modified in accordance with the teachings of the present invention. Accordingly, the user stations 18 and 20 may be terminals or separate computer systems such as personal computer, work station, etc. The plurality of switches 22–38 is interoperably coupled to produce communication paths between ports of the network.

Each of the switches 22–38 may be represented by a single object or a plurality of objects. Typically, the objects will be layered such that a single object will be used to represent the switch as a whole. When the particular object is selected, the user is presented with an option of seeing further objects corresponding to components within the switch, such as ports, links, bandwidth, congestion information, etc. As illustrated, the objects associated with switches 22, 24, 26, and 28 are managed by the element software module 14. The objects associated with switches 34, 36, and 38 are managed by the element manager software module 16. The objects associated with switches 30 and 32 are managed directly by the network manager software module 12. Further note that the network manager software module 12 also has managerial responsibility for the other switches within the network as well.

Each of the software modules 12, 14, and 16 produce a graphical user interface that may be displayed on either of the user stations 18 or 20. By way of example, user station 18 is coupled to software modules 12, 14, and 16. As such, user station 18 displays a graphical user interface from element manager 14, 16 and a graphical user interface from the network manager. The graphical user interfaces integration, with respect to the user, is transparent. As such, to the user, the objects appear to be associated with a single graphical user interface. As shown in this example, the graphical user interface associated with element manager 16 includes objects 46 and 50, while the GUI for element manager 14 includes objects 40, 42, and 44, and the network manager GUI includes objects 40, 44, and 46. Object 40 is shown to be selected via the bold line. Accordingly, the object selection status for user station 18 (i.e., user 1), identifies the object as object 40, and the software module currently responsible for management of that object. Hence, the associated software module is the network manager software module.

As further illustrated in the graphical user interface of user station 18, objects 40 and 44 appear in both the network manager GUI and the element manager 14 GUI. Similarly, object 46 appears in the network manager GUI and element manager 16. As such, for the shared objects, either one of the software modules (i.e., the network manager or the element manager) could be responsible for managing the particular object. Currently, the network manager software module is responsible for managing object 40. If, however, an operation were selected by the user that the element manager 14 is primarily responsible for, the object 40 within the element manager GUI 14 would be selected and the object selection status would be updated to indicate that the associated software module is now element manager 14. If, however, the function requested to be performed on the object by the network manager software has not yet been performed, the object selection status does not change until the function has been performed or canceled.

User station 20 is associated currently with the network manager 12 and the element manager 16. As such, the user station 20 includes a graphical user interface of the network manager and the element manager 16. In this illustration, object 44 is selected and is currently managed by the element manager 16. Accordingly, the object selection status for user 2, via user station 20, indicates that the selected object is 44 and the associated software module is element manager software module 16. If user 2 selects a different object, the object selection status would be updated depending upon which object was selected and which software module is responsible for management of the selected object.

By maintaining the object selection status, the multiple software modules may have overlapping managerial responsibilities for a plurality of objects (e.g., communication components within a communication network) without loss of operational sequences and without misapplication of selected functions. Such network components include network level interoperations, line cards, ports on a line card, diagnostics of such components, etc.

Figure 2:
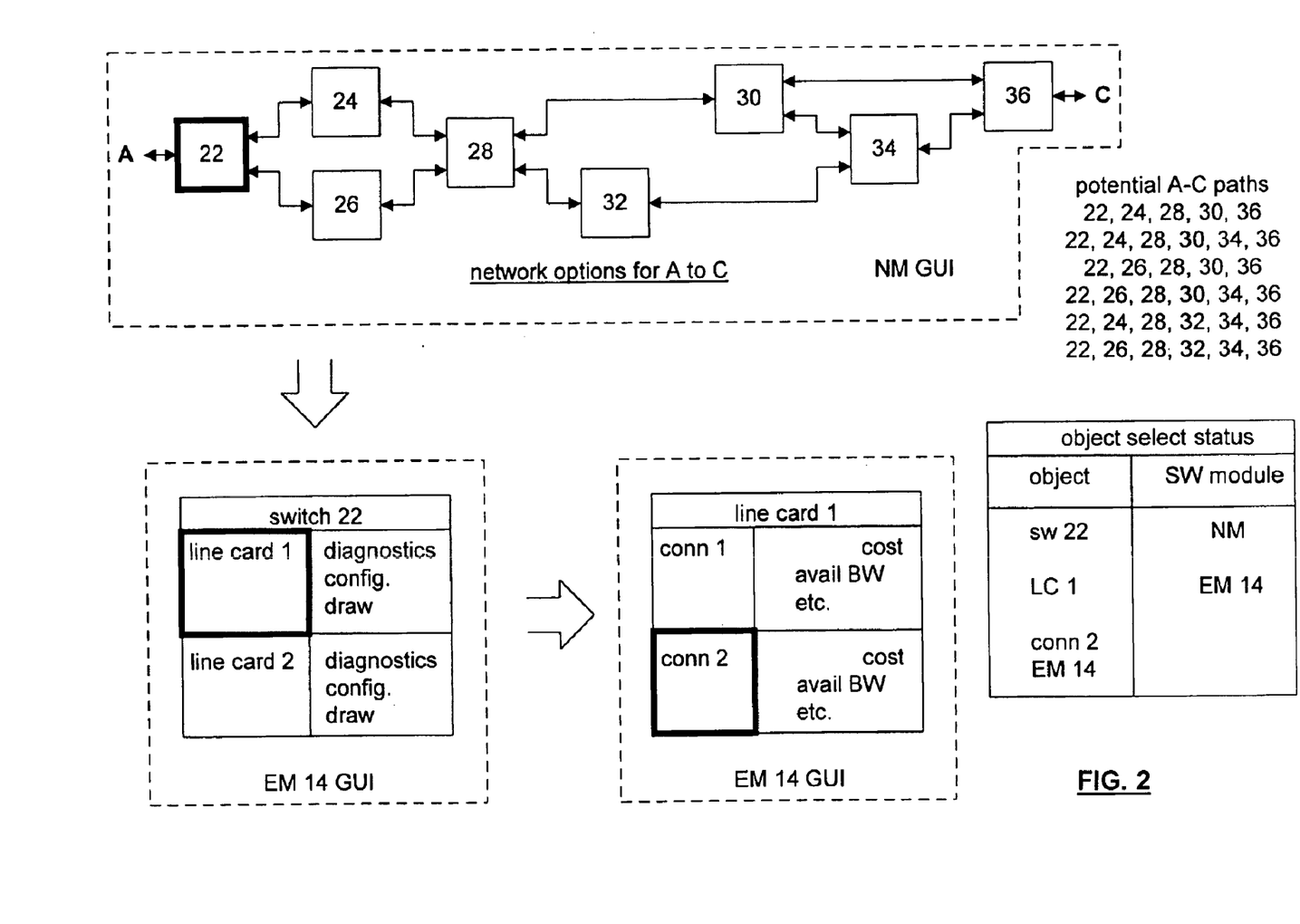
FIG. 2 illustrates a graphical representation of a display on a user station in accordance with the present invention.
Figure 3:
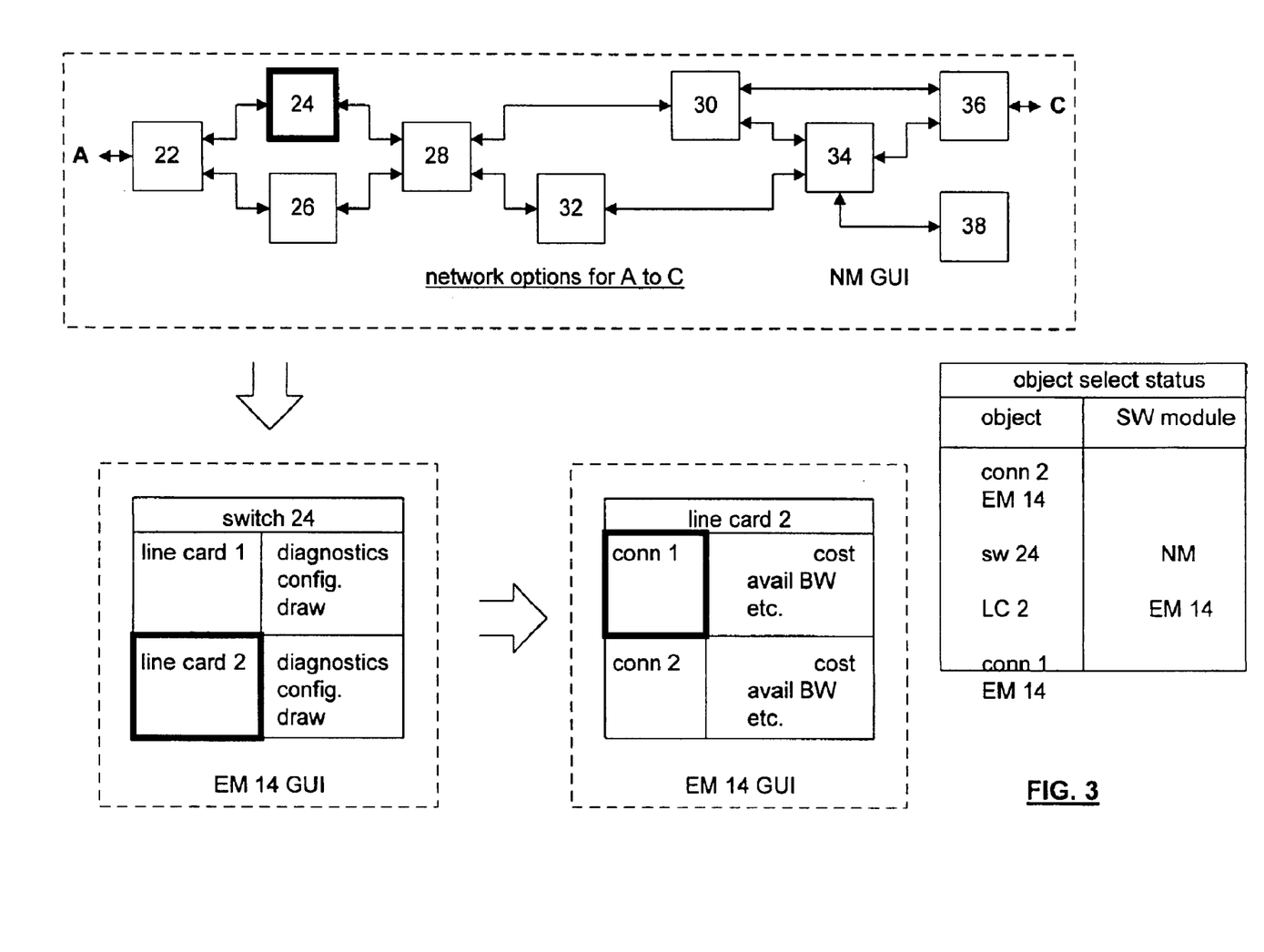
FIG. 3 illustrates a further graphical representation of a display on a user station in accordance with the present invention.

FIGS. 2 and 3 illustrate an example of establishing a communication path between port A associated with switch 22 and port C associated with switch 36. The illustrations of FIGS. 2 and 3 are representative of the graphical user interfaces presented on user station 18 or 20. As shown, the network management GUI includes an overall structure for the communication network. As such, each switch within the network is represented by a corresponding object 22–38. In this example, the user has selected the object corresponding to switch 22.

Having selected the object corresponding to switch 22, the user may select a particular user interface of switch 22 to function as node A. Such processing would be done by the network manager software 12. Further selection of the object may pass responsibility to the element manager 14, which presents a graphical user interface corresponding to switch 22. Such a graphical user interface may include an object for each line card contained on the switch, an object for diagnostics configuration, drawing information associated with each line card, etc.

In this illustration, the user has selected the line card 1 of the selected user interface for switch 22 via the element manager 14 graphical user interface. Note that the object selection status is updated to reflect that element manager 14 is responsible for acting upon the selected object. At the initial selection of switch 22, the associated software module was the network manager. Once line card 1 is selected, the associated software module becomes the element manager 14.

Having selected line card 1, the element manager 14 provides a new graphical user interface that corresponds to objects associated with line card 1. In particular, the line card may include a plurality of objects for each connection associated therewith and associated with each connection object corresponding to cost, available bandwidth, etc.

As shown, the user has selected connection 2 of line card 1 of switch 22 to support the coupling to node A. As such, the object selection status is updated to indicate the selected object is connection 2 and the associated software module is element manager 14. Note that the network manager software module maintains and updates the object selection status and provides an indication to each of the element software managers as to whether it is the active, or is the associated software manager module for the selected object. Correspondingly, the network manager software module sends deselect signals to the element managers when they are no longer the associated software module for the selected object. As such, only the associated software module will perform the requested operation upon the selected object.

The example of FIG. 2 is continued on FIG. 3. As shown, the user has now selected switch 24 via the network manager GUI. As such, the object selection status is updated to now indicate that switch 24 is the selected object and the network manager software module is the associated software module. At this point, the network software module informs the element manager software module that it is no longer the associated software module. The example continues with the user selecting line card 2 of switch 24 via the element manager 14 graphical user interface. At this point, the object selection status is updated by the network manager software to indicate that the selected object is line card 2 of switch 24 and the associated software module is element manager software module 14. In addition, the network manager would send a signal to the element manager indicating that it is the associated software module. The illustration continues by the user selecting connection 1 of line card 2 of switch 24. Accordingly, the object selection status is updated to indicate connection 1 of line card 2 and the associated software module is element manager 14. Note that at the same time a user is performing the establishment of a communication path between nodes A and C, another user may be establishing another communication path using the same switches. As such, both users are simultaneously accessing the network manager software module and the element manager software modules. Accordingly, the network management software module maintains object selection status for each of the particular users.

Figure 4:
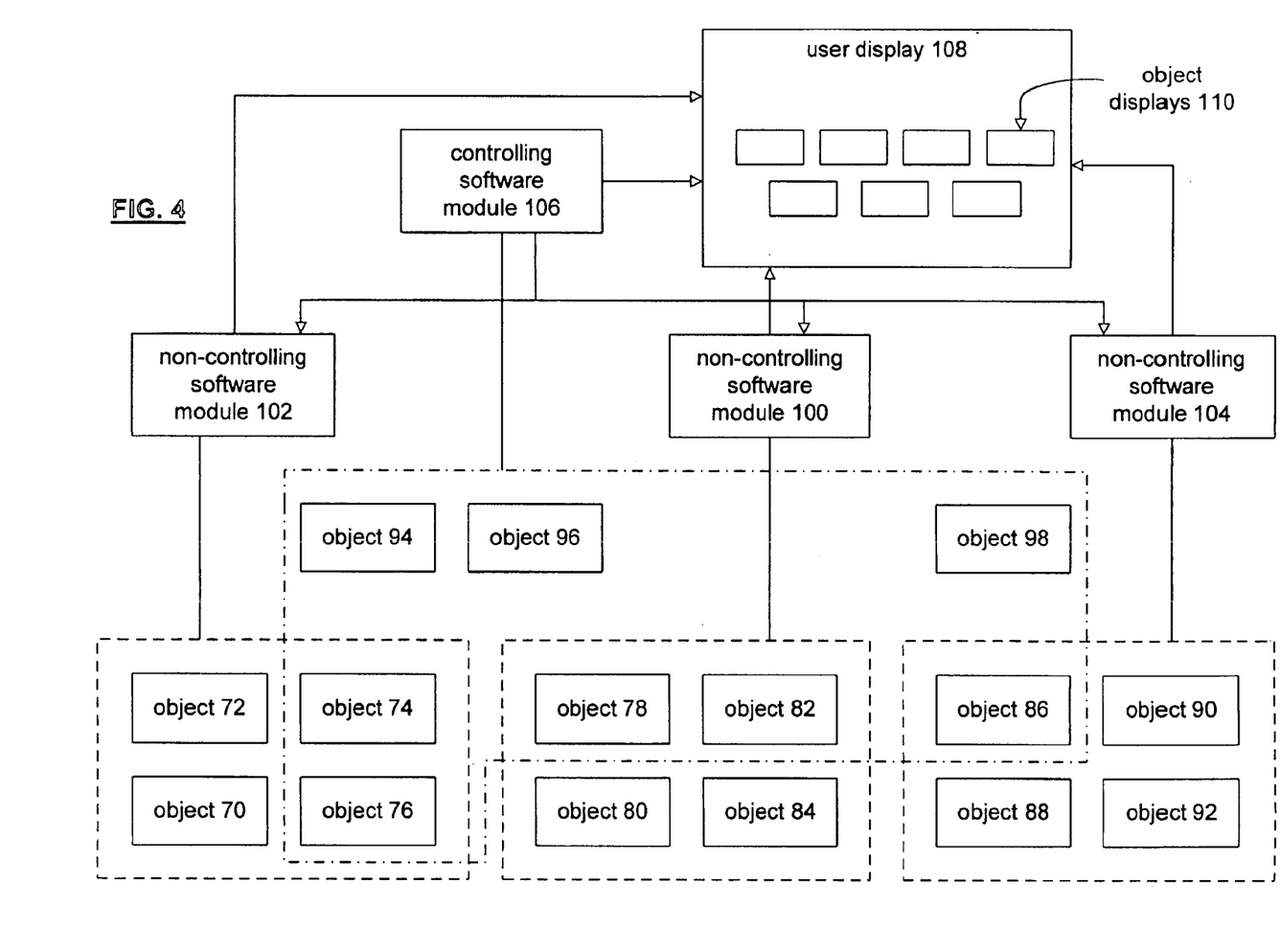
FIG. 4 illustrates a schematic block diagram of a plurality of software modules controlling a plurality of objects in accordance with the present invention.

FIG. 4 illustrates a schematic block diagram of a system that includes a plurality of objects 70–98, a plurality of non-controlling software modules 100–104, a controlling software module 106, and a user display 108. This system may be representative of a communication system as previously described with reference to FIGS. 1–3, or a computer system that has a plurality of processors or software application that act upon a shared pool of data which is represented by the plurality of objects. In this illustration, non-controlling software module 102 is responsible for the management of objects 70–76. The non-controlling software module 100 is responsible for managing objects 78–84 and non-controlling software module 104 is responsible for managing objects 86–92. The controlling software module 106 has primary management responsibilities for objects 94–98 and also management responsibilities for objects 74, 76, 78, 82, and 86.

The user display 108 is operably coupled to each of the software modules 100–106. Each of the software modules provides a graphical user interface to the user display 108. The graphical user interfaces, however, appear as a single graphical user interface to the user of the user display 108. As such, the user display 108 will display a plurality of objects 110. When the user selects a particular object via the user display 108, the controlling software module 106 determines the object selection status for the selected object. For example, if the user has selected object 74, and the object selection status indicates that for object 74, the non-controlling software module 102 is the currently active software module, the controlling software module 106 would not update the object selection status. In addition, the non-controlling software module 102 would process the particular request for object 74 by the user display 108.

Upon detecting the object selection and determining that the object selection status needs updating, the controlling software module 106 would update the object selection status accordingly. For example, assuming that the user has selected object 74, the current object selection status indicates that controlling software module 106 is the associated software module, and the controlling software module 106 determines that non-controlling software module 102 should be the associated software module, the controlling software module 106 updates the object selection status to indicate that the non-controlling software module 102 is the associated software module. In addition, the controlling software module would provide a select signal to the non-controlling software module 102 such that it would know to process the requested function.

The controlling software module 106 would also update the object selection status when the user selects a new object. For example, the user may select object 72 subsequent to selecting object 74. In this instance, the object selection status would be updated with object 72 and if the non-controlling software module 102 was not the associated software module, it would become it. As such, only a portion of the object selection status needs to be updated when the user makes a new object selection. As one of average skill in the art will appreciate, by maintaining the objection selection status for the system of FIG. 4, each of the independent software modules 100–106 may perform its particular functions upon selected objects in the appropriate manner. In other words, each of the software modules will only perform functions upon selected objects when it is the associated software module. This is in contrast to prior implementations of multiple software modules that function upon a shared pool of objects wherein whichever object provided the graphical user interface would be the software module to perform the function upon the object. As previously discussed, when this is allowed to occur, there are situations when the wrong software module is performing the wrong function upon the object thereby producing incorrect results.

Figure 5:
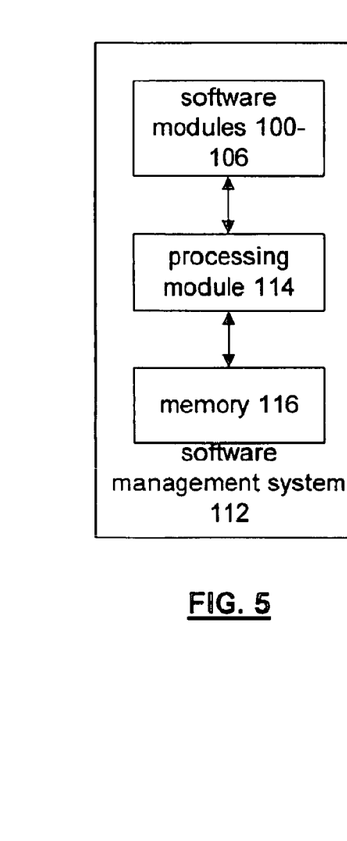
FIG. 5 illustrates a schematic block diagram of a software management system in accordance with the present invention.

FIG. 5 illustrates a schematic block diagram of a software management system 112 that includes software modules 100–106, a processing module 114 and memory 116. The processing module 114 may be a single processing device or a plurality of processing devices. Such a processing device may be a microprocessor, microcontroller, microcomputer, digital signal processor, state machine, logic circuitry, and/or any device that manipulates digital information based on operational instruction. The memory 116 may be a single memory device or a plurality of memory devices. Such a memory device may be read-only memory device, random access memory device, magnetic tape memory, floppy disk memory, hard drive memory, external tape, and/or any device that stores digital information. Note that when the processing module 114 implements one or more of its functions via a state machine or logic circuitry, the memory storing the corresponding instructions is embedded within the circuitry comprised of a state machine and/or logic circuitry. The operational instructions stored in memory 116 and performed by processing module 114 will be discussed in greater detail with reference to FIGS. 6 and 7.

Figure 6:
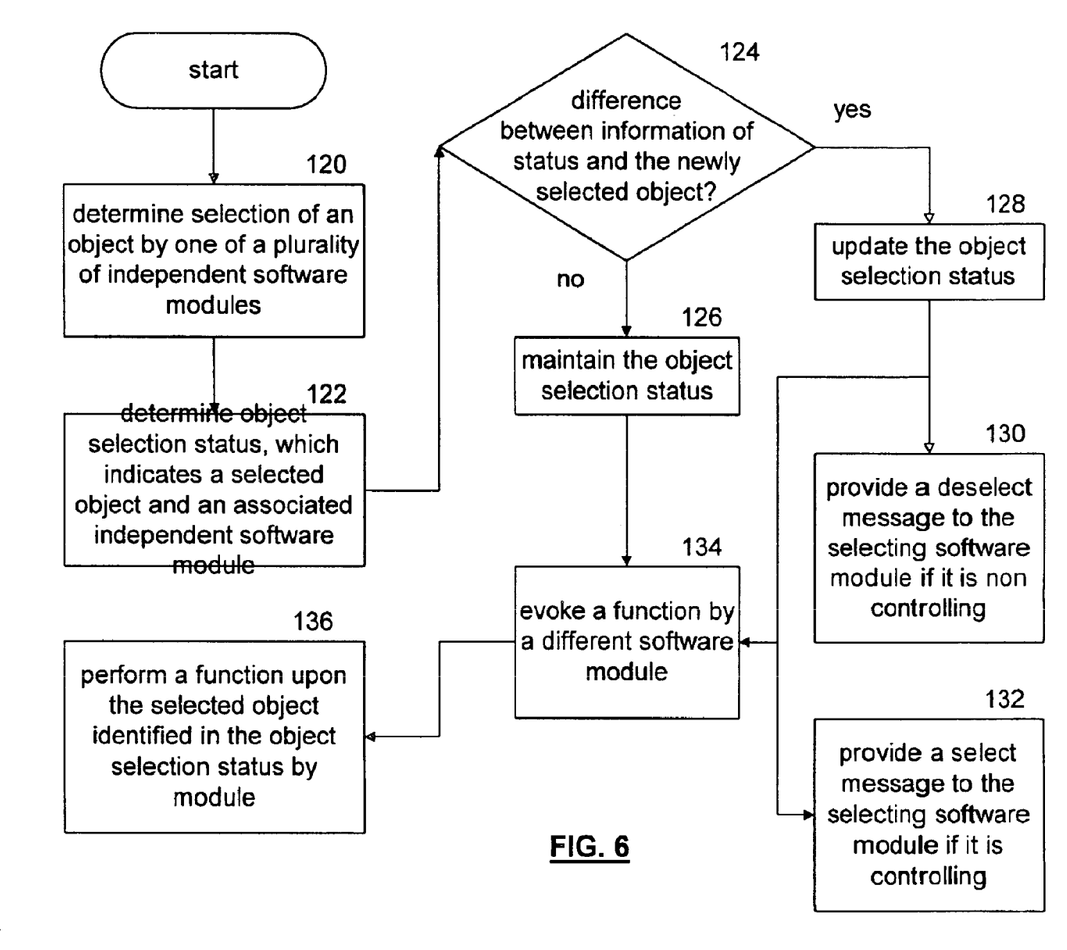
FIG. 6 illustrates a logic diagram of a method for providing reliable interoperation of the plurality of independent software modules in accordance with the present invention.

FIG. 6 illustrates a logic diagram of a method for providing reliable interoperation of a plurality of independent software modules. The process begins at step 120 where selection of an object element by one of a plurality of independent software modules is determined. Note that the plurality of independent software modules includes network management software modules, element network software modules, wherein the network software module performs network level operations for a communication network and the element network software modules perform lower level operations for corresponding portions of the communication networks. Further note that the independent software modules may alternatively be computer applications where at least some of the computer applications control independent user interfaces. Still further note that the object may include at least one object element. As such, when a particular object is selected, a plurality of object elements (e.g., a drop-down menu) may be displayed.

The process continues at step 122 where object selection status is determined. The object selection status indicates a selected object and an associated independent software module, which is responsible for performing functions upon the selected object. The process then proceeds to step 124 where a determination is made as to whether there is a difference between the information in the status and the newly selected objects. The difference may occur in that the new selected object is different from the object contained within the object selection status and/or the software module responsible for making the selection is different that in the status. If the response to step 124 is "no", the process proceeds to step 126 where the object selection status is maintained.

If, however, the response to step 124 was "yes", the process proceeds to step 128 where the object selection status is updated. The object selection status may be updated with at least one of the new objects selection and the one of the plurality of independent software modules making the selection. The process then proceeds to steps 130, 132 or 134. At step 130, a deselect message is provided to the selecting software module when the selecting software module is non-controlling. In other words, when the selecting software module is note responsible for performing functions upon the selected objects, it receives a deselect message. At step 132, a select message is provided to the selecting software module if it is the controlling software module. In other words, if the selecting software module is responsible for performing the function upon the selected object as indicated within the object selection status, it receives a select message.

At step 134, a function is evoked by a different software module than identified within the object selection status. The process then proceeds to step 136 where a function is performed upon the selected object identified in the object selection status by the controlling software module (i.e., the software module identified within the object selection status). Alternatively, the associated software module (i.e., the one identified in the object selection status) may pass the processing to the software module identified at step 124 to perform the particular function. Regardless of whether the software module identified in the object selection status performs the function or passes control of the function to another software module, the controlling software module makes such a determination such that functions on selected objects are done by the appropriate software modules thereby insuring that the functions are performed properly.

Figure 7:
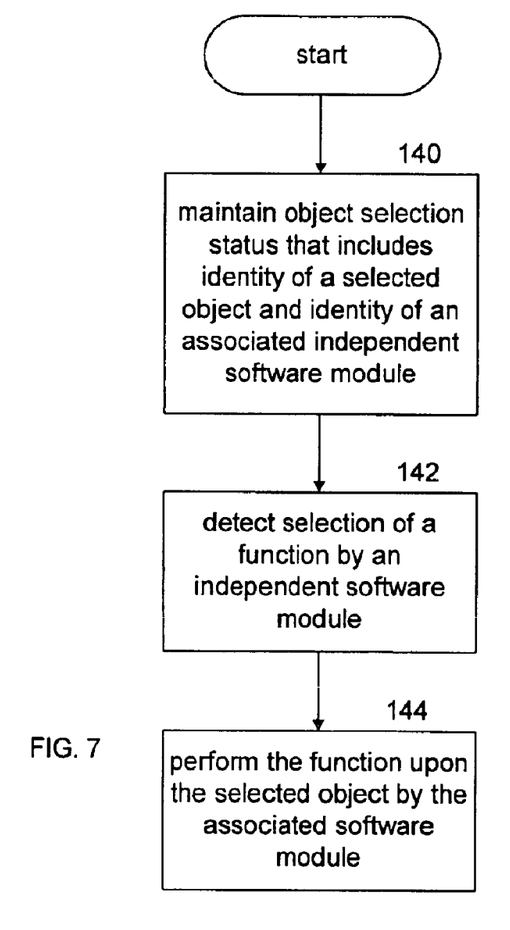
FIG. 7 illustrates a logic diagram of an alternate method for providing reliable interoperation of the plurality of independent software modules in accordance with the present invention.

FIG. 7 illustrates a logic diagram of an alternate method for providing reliable interoperation of a plurality of independent software modules. The process begins at step 140 where object selection status is maintained. The object selection status includes identity of a selected object, an identity of an associated independent software module. The process then proceeds to step 142 where selection of a function by an independent software module is detected. The detection may be done via a user interface associated with the independent software module. Alternatively, the detection may be done by receiving notification of the function from another one of the plurality of independent software modules, where another one of a plurality of independent software modules detects selection of a function via a user interface associated with the one of the plurality of independent software modules. In other words, one of the software modules may support the GUI which receives the selection while another software module is responsible for performing the function that has been selected via the GUI. The process then proceeds to step 144 where the function is performed upon the selected object by the associated software module.

The preceding discussion has presented a method and apparatus for providing reliable operation of the plurality of independent software modules. By maintaining object selection status, a single object may be selected and have a single associated software module responsible for performing functions upon that object. Regardless of which software module receives the selection of the objects, the associated software module is responsible for performing the function. As such, the multiple independent software modules operate in concert upon a selected object such that functions are executed appropriately thereby avoiding misexecution of function as occurred in previous embodiments.

What is claimed is:

1. A method for providing reliable interoperation of a plurality of independent software modules, the method comprises the steps of:

a) determining selection of an object by one of the plurality of independent software modules to produce a new object selection;

b) determining object selection status, which indicates a selected object and an associated one of the plurality of independent software modules; and c) updating the object selection status when a difference occurs between at least one of: the one of the plurality of independent software modules and the associated one of the plurality of independent software modules and the new object selection and the selected object.

2. The method of claim 1 further comprises:

evoking a function by an independent software module of the plurality of independent software modules; and performing, by the independent software module, the function upon the selected object identified in the object selection status.

3. The method of claim 2 further comprises obtaining, by the independent software module, the function from the associated one of the plurality of independent software modules.

4. The method of claim 2 further comprises informing, by the independent software module, the associated one of the plurality of independent software modules to perform at least one of: the function upon the selected object and a corresponding function upon the selected object.

5. The method of claim 1, wherein step (c) further comprises updating the object selection status with at least one of: the new object selection and the one of the plurality of independent software modules.

6. The method of claim 1 further comprises providing a deselect message to the associated one of the plurality of independent software modules when the status is updated and when the associated one of the plurality of independent software modules is not a controlling software module.

7. The method of claim 1, wherein step (a) further comprises receiving a select message from the one of the plurality of independent software modules when the one of the plurality of independent software modules is not a controlling software module.

8. The method of claim 1 further comprises providing a select message to the associated one of the plurality of independent software modules when the status is updated and when the associated one of the plurality of independent software modules is not a controlling software module.

9. The method of claim 1, wherein the plurality of independent software modules includes at least one network management software module and a plurality of element network software modules, wherein the at least one network software module performs network level operations for a communication network and wherein each of the plurality of element network software modules performs area level operations for a corresponding portion of the communication network.

10. The method of claim 1, wherein the plurality of independent software modules includes computer applications, wherein at least some of the computer applications control independent user interfaces.

11. The method of claim 1, wherein the object includes at least one object element.

12. A method for providing reliable interoperation of a plurality of independent software modules, the method comprises the steps of:

a) maintaining object selection status that includes identity of a selected object and identity of an associated one of the plurality of independent software modules, wherein the associated one of the plurality of independent software modules selected the selected object;

b) detecting selection of a function by an independent software module of the plurality of independent software modules; and c) performing, by one of the plurality of independent software modules, the function upon the selected object.

13. The method of claim 12, wherein step (b) further comprises detecting selection via a user interface associated with the independent software module.

14. The method of claim 12, wherein step (b) further comprises receiving notification of the function from another one of the plurality of independent software modules, wherein the another one of the plurality of independent software modules detected selection of the function via a user interface associated with the one of the plurality of independent software modules.

15. The method of claim 12, wherein step (a) further comprises:

determining selection of a new selected object by one of the plurality of independent software modules to produce a new object selection;

determining current object selection status; and updating the object selection status when a difference occurs between at least one of: the one of the plurality of independent software modules and the associated one of the plurality of independent software modules and the new object selection and the selected object.

16. The method of claim 15 further comprises updating the object selection status with at least one of the new selected object and the one of the plurality of independent software modules.

17. The method of claim 15 further comprises providing a deselect message to the associated one of the plurality of independent software modules when the status is updated and when the associated one of the plurality of independent software modules is not a controlling software module.

18. The method of claim 15, wherein step (a) further comprises receiving a select message from the one of the plurality of independent software modules when the one of the plurality of independent software modules is not a controlling software module.

19. The method of claim 15 further comprises providing a select message to the associated one of the plurality of independent software modules when the status is updated and when the associated one of the plurality of independent software modules is not a controlling software module.

20. A software management system comprises:

a plurality of independent software modules;

a processing module; and memory operably coupled to the processing module, wherein the memory includes operational instructions that cause the processing module to (a) determine selection of an object by one of the plurality of independent software modules to produce a new object selection; (b) determine object selection status, which indicates a selected object and an associated one of the plurality of independent software modules; and (c) update the object selection status when a difference occurs between at least one of: the one of the plurality of independent software modules and the associated one of the plurality of independent software modules and the new object selection and the selected object.

21. The software management system of claim 20, wherein the memory further comprises operational instructions that cause the processing module to enable:

an independent software module of the plurality of independent software modules to perform a function upon the selected object identified in the object selection status when the function is evoked by the independent software module.

22. The software management system of claim 21, wherein the memory further comprises operational instructions that cause the processing module to enable the independent software module to obtain the function from the associated one of the plurality of independent software modules.

23. The software management system of claim 21, wherein the memory further comprises operational instructions that cause the processing module to enable the independent software module to inform the associated one of the plurality of independent software modules to perform at least one of: the function upon the selected object and a corresponding function upon the selected object.

24. The software management system of claim 20, wherein the memory further comprises operational instructions that cause the processing module to update the object selection status with at least one of: the new object selection and the one of the plurality of independent software modules.

25. The software management system of claim 20, wherein the memory further comprises operational instructions that cause the processing module to provide a deselect message to the associated one of the plurality of independent software modules when the status is updated and when the associated one of the plurality of independent software modules is not a controlling software module.

26. The software management system of claim 20, wherein the memory further comprises operational instructions that cause the processing module to determine selection of the object associated with the one of the plurality of independent software modules by receiving a select message from the one of the plurality of independent software modules when the one of the plurality of independent software modules is not a controlling software module.

27. The software management system of claim 20, wherein the memory further comprises operational instructions that cause the processing module to provide a select message to the associated one of the plurality of independent software modules when the status is updated and when the associated one of the plurality of independent software modules is not a controlling software module.

28. The software management system of claim 20, wherein the plurality of independent software modules includes at least one network management software module and a plurality of element network software modules, wherein the at least one network software module performs network level operations for a communication network and wherein each of the plurality of element network software modules performs area level operations for a corresponding portion of the communication network.

29. The software segment system of claim 20, wherein the object includes at least one object element.

30. A software management system comprises:
a plurality of independent software modules;
a processing module; and
memory operably coupled to the processing module, wherein the memory includes operational instructions that cause the processing module to (a) maintain object selection status that includes identity of a selected object and identity of an associated one of the plurality of independent software modules, wherein the associated one of the plurality of independent software modules selected the selected object; (b) detect selection of a function by an independent software module of the plurality of independent software modules; and (c) performing, by one of the plurality of independent software modules, the function upon the selected object.

31. The software management system of claim 30, wherein the memory further comprises operational instructions that cause the processing module to detect selection of the function via a user interface associated with the independent software module.

32. The software management system of claim 30, wherein the memory further comprises operational instructions that cause the processing module to detect selection of the function by receiving notification of the function from another one of the plurality of independent software modules, wherein the another one of the plurality of independent software modules detected selection of the function via a user interface associated with the one of the plurality of independent software modules.

33. The software management system of claim 30, wherein the memory further comprises operational instructions that cause the processing module to maintain the object selection status by:
determining selection of a new selected object by one of the plurality of independent software modules to produce a new object selection;
determining current object selection status; and
updating the object selection status when a difference occurs between at least one of: the one of the plurality of independent software modules and the associated one of the plurality of independent software modules and the new object selection and the selected object.

34. The software management system of claim 33, wherein the memory further comprises operational instructions that cause the processing module to update the object selection status with at least one of: the new selected object and the one of the plurality of independent software modules.

35. The software management system of claim 33, wherein the memory further comprises operational instructions that cause the processing module to provide a deselect message to the associated one of the plurality of independent software modules when the status is updated and when the associated one of the plurality of independent software modules is not a controlling software module.

36. The software management system of claim 33, wherein the memory further comprises operational instructions that cause the processing module to determine the selection of the new selected object by receiving a select message from the one of the plurality of independent software modules when the one of the plurality of independent software modules is not a controlling software module.

37. The software management system of claim 33, wherein the memory further comprises operational instructions that cause the processing module to provide a select message to the associated one of the plurality of independent software modules when the status is updated and when the associated one of the plurality of independent software modules is not a controlling software module.

* * * * *